United States Patent [19]

Braswell et al.

[11] 4,120,610

[45] Oct. 17, 1978

[54] HELICOPTER BLADE STRUCTURE

[75] Inventors: James L. Braswell; Cecil E. Covington, both of Hurst; Nolan B. Phillips, Forth Worth; David E. Snyder, Arlington, all of Tex.

[73] Assignee: Textron, Inc., Providence, R.I.

[21] Appl. No.: 470,520

[22] Filed: May 16, 1974

[51] Int. Cl.² .............................................. B64C 27/48
[52] U.S. Cl. ................................... 416/226; 416/230
[58] Field of Search .................. 416/226, 230, 241 A, 416/229, 144

[56] References Cited

U.S. PATENT DOCUMENTS

| 3,237,697 | 3/1966 | Ford et al. | 416/226 |
|---|---|---|---|
| 3,333,642 | 8/1967 | Kee | 416/226 |
| 3,476,484 | 11/1969 | Brunsch | 416/230 |
| 3,528,753 | 9/1970 | Dutton et al. | 416/230 X |
| 3,533,714 | 10/1970 | Pfleiderer | 416/230 X |
| 3,552,881 | 1/1971 | Rogers et al. | 416/226 X |
| 3,713,751 | 1/1973 | Fradenburgh et al. | 416/226 X |
| 3,754,840 | 8/1973 | Zincone | 416/226 |
| 3,782,856 | 1/1974 | Salkind et al. | 416/226 |

FOREIGN PATENT DOCUMENTS 1,531,369  1/1970  Fed. Rep. of Germany ........... 416/230

Primary Examiner—Everette A. Powell, Jr.
Attorney, Agent, or Firm—Richards, Harris & Medlock

[57] ABSTRACT

A helicopter main rotor blade having a metallic nose spar extending the length of the leading edge of the blade and a trailing edge skin attached to the nose spar. A closure channel fixed within the nose spar extends the length thereof with unidirectional fiberglass material fixed to and extending along the length of the closure channel. A bushing on the inboard end of the blade preferably is attached both to the nose spar and the fiberglass bands for transfer of centrifugal forces in the blade to a grip.

11 Claims, 8 Drawing Figures

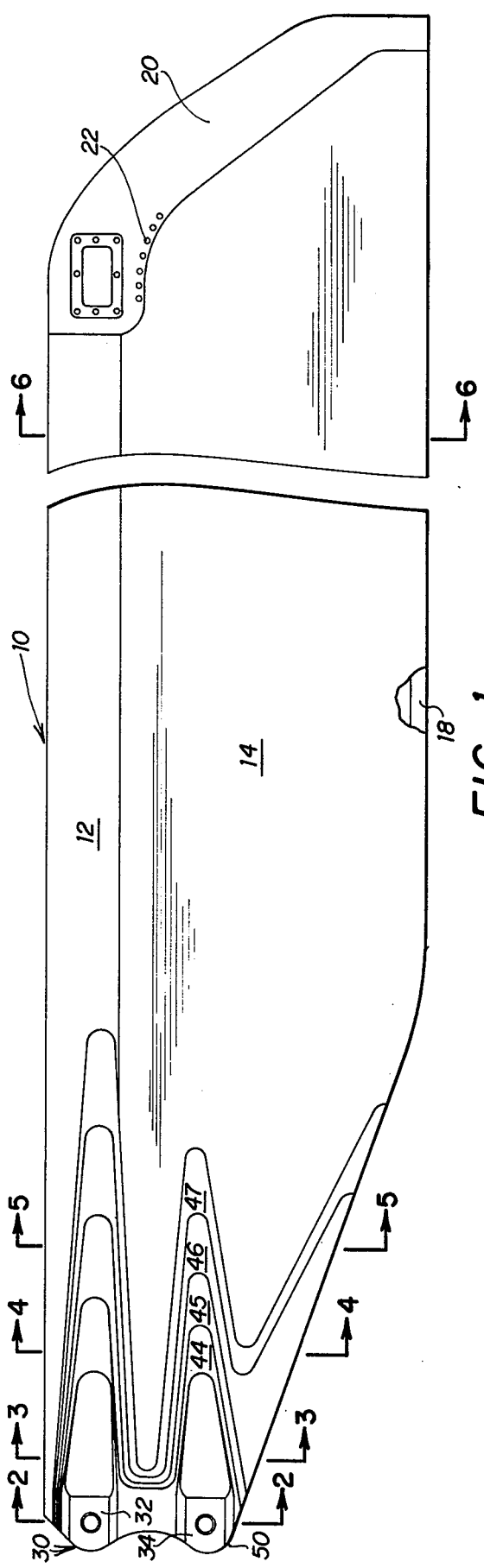

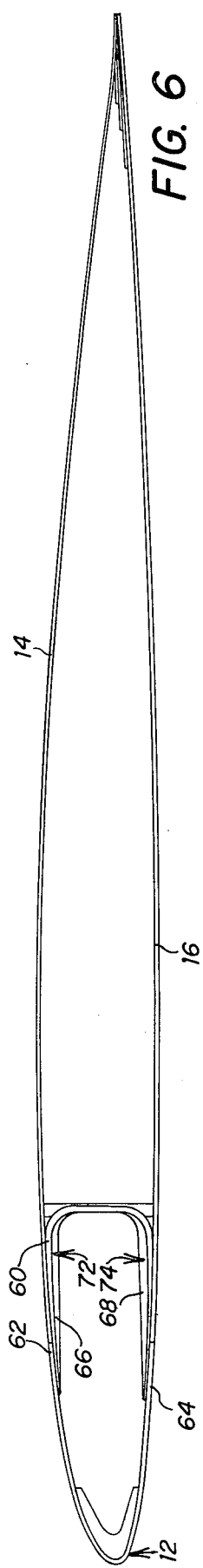
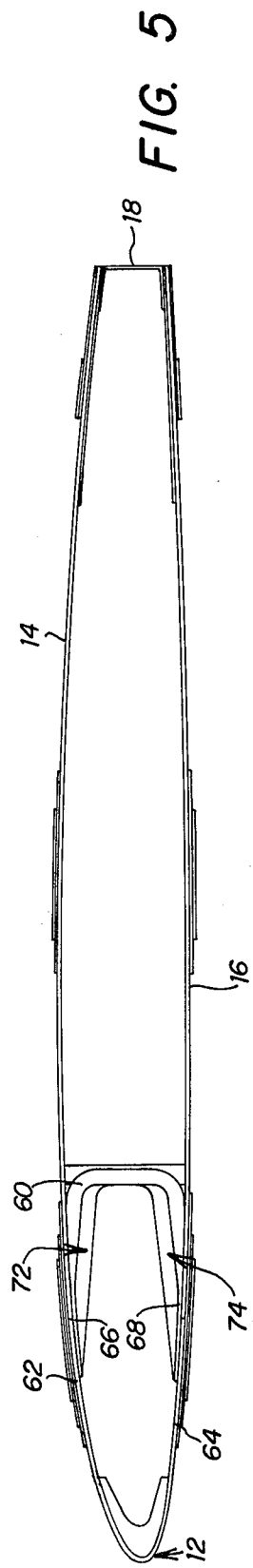
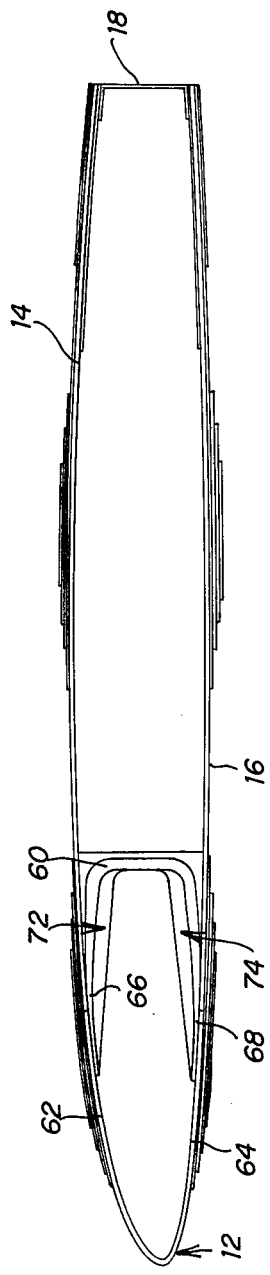
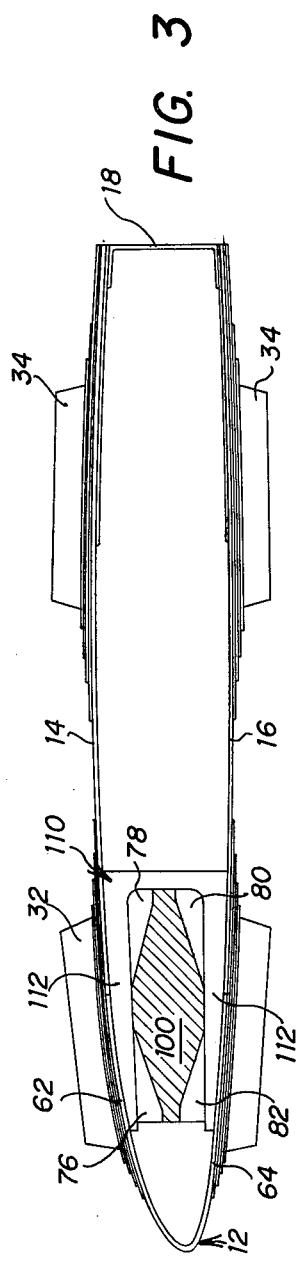
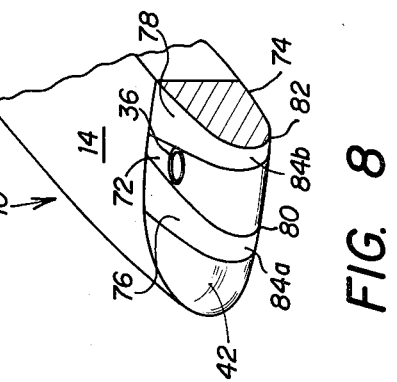

HELICOPTER BLADE STRUCTURE

BACKGROUND OF THE INVENTION

This invention relates to improvements in helicopter aircraft, and more particularly to an improved helicopter rotor blade for minimizing danger resulting from fatigue failures in the main rotor blades.

In helicopter aircraft, the main rotor blades provide the primary lift forces for supporting the aircraft in flight. The main rotor blades are attached to rotate with the rotor mast.

Conventionally, each main helicopter rotor blade comprises a nose spar extending the length of the blade with one end coupled to the rotor mast. The nose spar provides the main centrifugal load path for the blade components. A trailing skin is attached to and supported by the nose spar to provide lift surfaces. A tip member is attached to the outboard end of the nose spar to seal the outer end of the blade. A trailing closure channel extends along and is attached to the interior of the nose spar. The remainder of the blade is filled with lightweight material to give the blade rigidity. During rotation of the main rotor vibration and centrifugal stress are created within the blades. In some instances, these stresses will produce a fatigue failure in the nose spar, causing one of the main rotor blades to break and the aircraft to lose its lift and crash without warning to the occupants. Advanced fatigue damage to a blade may be evidenced only by a small crack in the rotor blade which is difficult to detect and avoid failure.

It is therefore a feature of the present invention to provide an improved rotor blade having a centrifugal loading structure allowing the aircraft to fly for a limited period of time should a nose spar fail.

In accordance with the present invention, there is provided an improved rotor blade having a metallic load carrying nose spar supporting a trailing section. A secondary centrifugal load bearing member is provided for assuming the centrifugal blade loads for a short period of time should the nose spar fail during use to allow safe landing of the aircraft.

In accordance with a more specific aspect of the present invention, an improved rotor blade is provided including a nose spar extending the length of the leading edge of the blade and open to the rear at upper and lower trailing edges. A mating channel closure member extends along the length of the nose spar and is attached to the inside of the upper and lower trailing edges thereof. The trailing portion of the blade is formed by a skin filled with lightweight material. Bands of unidirectional fiberglass material are attached to the flanges of the closure member and extend the length thereof. The fiberglass bands have a modulus of elasticity substantially lower than that of the nose spar and provide a redundant centrifugal load path in the event that the nose spar should fail during use of the aircraft.

BRIEF DESCRIPTION OF THE DRAWINGS

A more complete understanding of the invention and its advantages will be apparent from the specification, claims and the accompanying Drawings illustrating the invention in which:

FIG. 1 is a broken plan view of the improved rotor blade of the present invention;

FIGS. 2-6 are enlarged section views taken vertically in FIG. 1;

FIG. 7 is an exploded perspective view illustrating the arrangement of the connection of the unidirectional fiberglass bands to a spool; and FIG. 8 is a perspective view with the upper blade surface partially cut away to illustrate an alternate band connection.

DESCRIPTION OF THE PREFERRED EMBODIMENT

Referring now to the Drawings wherein like reference characters designate like or corresponding parts throughout the views there is shown in FIG. 1, an improved rotor blade of the present invention which, for purposes of description, is designated by reference numeral 10. Blade 10 has a nose spar 12, and upper and lower after body skin sections 14 and 16. Skin sections 14 and 16 are attached together by a trailing edge spar 18. An outboard end tip cap 20 is secured to nose spar 12, skin sections 14 and 16, and trailing edge spar 18.

A blade attachment area 30 is provided on the inboard end of blade 10 for attachment to a hub grip of a rotating mast in accordance with conventional helicopter design. Blade attachment area 30 includes upper and lower grip plates 32 on the leading edge and upper and lower grip plates 34 on the trailing edge. Extending through grip plates 32 and 34 are bushings 36 for receiving fasteners to attach the blade to a hub grip attached to the helicopter rotor mast. Compression rigidity is imported to the attachment area by means of a strap spool 40 and chopped fiber compression block material 42.

Extending along the longitudinal axis of blade 10 from grip plates 32 and 34 are doublers 44 through 47. Each doubler is basically a V-shaped member extending the width of the structural portion of the blade. Doublers 44 through 47 are secured to the inboard ends of skins 14 and 16 in a laminated fashion.

As illustrated particularly in FIGS. 2-6, nose spar 12 is provided with a closure channel 60 extending the length of nose spar 12. In the preferred embodiment, closure channel 60 is constructed from fiberglass material with a 45° × 45° glass fiber orientation along its length. Channel 60 is attached to the interior of the upper and lower trailing flanges, 62 and 64, respectively, of nose spar 12. Closure 60 has upper and lower flanges 66 and 68, respectively, and varies in cross-sectional configuration along its length. Upper flange 66 is attached to the inside surface of the upper flange 62 of spar 12 and lower flange 68 is attached to the inside surface of the lower flange 64 of spar 12. Channel 60 is positioned so that its flanges 66 and 68 overlap the edges of flanges 62 and 64 to provide a surface for attaching skins 14 and 16 to spar 12.

According to a particular feature of the present invention, a quality of unidirectional fiberglass material is attached to the interior surfaces of flanges 66 and 68. The glass fibers are aligned to extend along the length of channel 60 and are bonded to the interior surfaces of flanges 66 and 68. The material is shaped into two bands, 72 and 74, which extend, respectively, along upper and lower flanges 66 and 68.

The inboard ends of bands 72 and 74 are wrapped around strap spool 40. The particular structure of the attachment is illustrated in FIG. 7. Closure channel 60 is shown terminating at a point outboard of bushing 36. Upper band 72 separates into fiber groups 76 and 78 whereas lower band 74 separates into fiber groups 80 and 82. The fiber in groups 76 and 82 are connected to the fiber in groups 78 and 80 to form loop 84. Spool 40 has upper and lower flanges 88 and 90, respectively, bordering a cylindrical contact surface 92. Loop 84 is positioned around surface 92. An axial bore 94 extends through spool 40 for attaching spool 40 to the inboard end of blade 10 by inserting bushing 36 through bores 94 and 96.

A filler block 100 can be positioned within the space 101 formed in loop 84 to add rigidity to the structure. A transition channel 110 is placed over the exterior of the assembly with the outboard end of channel 110 overlapping the inboard end of channel 60 and the inboard end of the flanges of channel 110 abutting flanges 88 and 90 of spool 40.

An alternate configuration is shown in FIG. 8. Bands 72 and 74 are parted to wrap vertically around the improved surface a compression block 42a. Compression block 42a includes structure to receive bushing 36. Upper band 72 separates into fiber groups 76 and 78 whereas lower band 74 separates into fiber groups 80 and 82. In contrast to the embodiment of FIG. 7, however, the fibers in group 76 are integral with or are connected to the fibers in group 82 to form loop 84a. Fibers in group 78 are integral with or are connected to the fiber in group 80 to form loop 84b.

According to another specific feature of the present invention, fiberglass material is selected to have a modulus of elasticity substantially smaller than that of nose spar 12. This substantial difference in modulus of elasticity causes nose spar 12 to operate at a substantially higher stress than the fiberglass material, thus ensuring that the fiberglass material will have a longer life and will fail after spar 12.

In the preferred embodiment, the nose spar is formed of steel material with a modulus of elasticity of $26 \times 10^6$, a fatigue strength of $2 \times 10^4$ psi and an ultimate strength of $15 \times 10^4$ psi, whereas the fiberglass band material has a modulus of elasticity of $6 \times 10^6$, a fatigue strength of $2 \times 10^4$ psi, and an ultimate strength of $18 \times 10^4$ psi.

Due to the relatively low modulus of elasticity of the fiberglass material, spar 12 will operate at a higher stress during flight of the helicopter. The cyclic loading of the blade during flight can, in some cases, eventually cause spar 12 to fail because of fatigue. Once spar 12 fails, the fiberglass material of bands 72 and 74 will assume the full load, preventing blade 10 from completely severing. The life of bands 72 and 74 will allow the helicopter to continue operating for a short time to allow safe landing of the helicopter.

It is to be understood, of course, that other materials could be used in the formation of a blade which permitted the redundancy against fatigue failure of the blade. Therefore, many modifications can be made in the materials and configuration of the various components without departing from the spirit and scope of the present invention as defined in the appended claims.

We claim:

1. A helicopter blade comprising:
   (a) an elongated metallic nose spar having a closure member therefor to form a nose spar assembly of material having a high modulus of elasticity and having upper and lower trailing flanges closed by said member with a coupling bushing directly connected to said assembly for direct transfer of primary loads from said spar to said bushing,
   (b) a trailing skin structure attached to and supported from said nose spar assembly,
   (c) bands of unidirectional fiberglass material having a lower modulus of elasticity than said assembly and extending the length of the blade and bonded to the upper and lower interior surfaces of said nose spar assembly with a loop formed at the root of said blade by said bands and attached to said bushing for secondary transfer of load from said blade, and
   (d) grip means engaging said bushing to couple said blade to a helicopter rotor mast whereby said nose spar assembly normally will operate at high strain levels and said bands operate at low strain levels until failure of said nose spar assembly and thereafter maintain the load.

2. In combination, a helicopter blade having an elongated nose spar extending the length of the blade forming the primary tensile member, and a trailing blade structure attached to and supported by said nose spar, the improvement which comprises a closure channel for said nose spar secured to the trailing edges of said nose spar and the leading edges of said trailing blade structure to form a nose spar assembly, unidirectional fiberglass bands secured to the inside of said nose spar assembly and extending the length of said blade to form a secondary tensile structure to carry the centrifugal load of said blade should said nose spar fail and means to receive centrifugal loads directly from both said assembly and said bands.

3. The combination of claim 2 wherein a plurality of external doublers extend the width of said blade near the inboard end to transfer the loads at said inboard end.

4. The combination of claim 2 wherein the modulus of elasticity of said band is substantially less than the modulus of elasticity of said nose spar.

5. The combination of claim 2 additionally comprising a connecting sleeve on the inboard end of said blade, whereby said blade may be connected to a helicopter, means attaching said sleeve to said nose spar, and means attaching said band to said sleeve.

6. The combination of claim 5 wherein said means connecting said band to said sleeve comprises a loop formed in the end of said band and positioned around said sleeve.

7. A redundant helicopter blade in which an elongated nose spar extends the length of said blade and forms the primary tensile member, the combination comprising:
   (a) a spar closure channel having upper and lower flanges which overlap the inside surface of the trailing edges of said nose spar;
   (b) a trailing blade structure supported from said spar through said closure channel; and
   (c) unidirectional fiberglass band secured to said upper and lower flanges and extending the length of said blade to form a secondary tensile member.

8. The combination of claim 7 in which the glass fiber in said unidirectional fiberglass band is in the form of a flat strap and is secured to the inside upper and lower flanges of said closure channel.

9. The combination set forth in claim 7 in which the modulus of elasticity of said fiberglass band is substantially less than the modulus of elasticity of said nose spar.

10. The combination set forth in claim 7 additionally comprising a connecting sleeve on the inboard end of said blade, means attaching said sleeve to said nose spar, and means attaching said band to said sleeve.

11. A helicopter blade comprising:

(a) an elongated metallic nose spar having a closure member therefor having upper and lower inner flanges to form a nose spar assembly of material having a high modulus of elasticity and having upper and lower trailing flanges closed by said member with a coupling bushing directly connected to said assembly for direct transfer of primary loads from said spar to said bushing, (b) a trailing skin structure attached to and supported from said nose spar assembly, (c) bands of unidirectional fiberglass material having a lower modulus of elasticity than said assembly and extending the length of the blade and bonded to the upper and lower interior surfaces of said upper and lower inner flanges with a loop formed at the root of said blade by said bands and attached to said bushing for secondary transfer of load from said blade, and (d) grip means engaging said bushing to couple said blade to a helicopter rotor mast whereby said nose spar assembly normally will operate at high strain levels and said bands operate at low strain levels until failure of said nose spar assembly and thereafter maintain the load.

* * * * *